United States Patent
Aker

(10) Patent No.: US 6,501,418 B1
(45) Date of Patent: Dec. 31, 2002

(54) PATROL SPEED ACQUISITION IN POLICE DOPPLER RADAR

(75) Inventor: John L. Aker, Kansas City, MO (US)

(73) Assignee: Applied Concepts, Inc.

( * ) Notice: Subject to any disclaimer, the term of this patent is extended or adjusted under 35 U.S.C. 154(b) by 0 days.

(21) Appl. No.: 10/120,120

(22) Filed: Apr. 9, 2002

(51) Int. Cl.⁷ .............................................. G01S 13/60
(52) U.S. Cl. ........................ 342/104; 342/114; 342/115
(58) Field of Search ................................. 342/104, 112, 342/114, 115, 116, 117, 192, 194, 195, 196, 99

(56) References Cited

U.S. PATENT DOCUMENTS

| | | | | |
|---|---|---|---|---|
| 3,936,824 A | * | 2/1976 | Aker et al. .................. | 342/115 |
| RE29,401 E | * | 9/1977 | Aker et al. .................. | 342/115 |
| 4,236,140 A | * | 11/1980 | Aker et al. .................. | 342/115 |
| 4,319,245 A | * | 3/1982 | Mawhinney ................. | 342/104 |
| 4,335,382 A | * | 6/1982 | Brown et al. ............... | 342/104 |
| 4,335,383 A | * | 6/1982 | Berry ......................... | 342/115 |
| 4,517,566 A | * | 5/1985 | Bryant et al. ................ | 342/117 |
| 5,525,996 A | * | 6/1996 | Aker et al. .................. | 342/104 |
| 5,570,093 A | * | 10/1996 | Aker et al. .................. | 342/104 |
| 6,023,236 A1 | * | 2/2002 | Shelton ....................... | 342/104 |
| 6,198,427 B1 | * | 3/2002 | Aker et al. .................. | 342/114 |
| 2002/0080062 A1 | * | 6/2002 | Aker et al. .................. | 342/114 |

OTHER PUBLICATIONS

"Improving on police radar", Fisher, P.D., IEEE Spectrum, vol.: 29 Issue: 7, Jul. 1992, pp.: 38–43.*

* cited by examiner

Primary Examiner—John B. Sotomayor
(74) Attorney, Agent, or Firm—Ronald Craig Fish; Ronald Craig Fish, A Law Corporation

(57) ABSTRACT

A process and apparatus to automatically determine whether a police radar is installed in a vehicle which has a coupling between a vehicle speed sensor and the police radar. The process automatically, without any operator input, determines the correct ratio between the true ground speed and the frequency output by vehicle speed sensor at that ground speed. The process and apparatus then use that ratio and the frequency from the vehicle speed sensor to establish a software search window that limits the speed range of the search by the police traffic radar for the true ground speed.

4 Claims, 11 Drawing Sheets

PROCESS TO USE Vss RATIO AFTER CALIBRATION PROCESS COMPLETED - PREFERRED EMBODIMENT

PATROL SPEED ACQUISITION IN POLICE DOPPLER RADAR

BACKGROUND OF THE INVENTION

Police Doppler radars need to acquire the patrol speed of the police car in various moving modes to be able to calculate the target speed of a tracked target in either moving, same lane mode or moving, opposite lane mode. In moving, opposite lane mode, the speed of the patrol car must be subtracted from the Doppler closing speed of the target being tracked to correctly calculate the speed of the target. In moving, same lane mode, the speed of the patrol car must be added to the Doppler closing speed found from the radar returns to derive the actual speed of the target. Obviously if the patrol speed is wrong, the calculated speed of the target will be wrong.

In the prior art Doppler radars such as the Applied Concepts Stalker Dual and the Kustom Eagle series as well as other Doppler police radars, the patrol speed was acquired by searching the Fourier components of the Doppler return signal for radar reflections from stationary objects such as billboards, trees, the ground, etc. Usually, the strongest signal component represented a return from the ground or another stationary object. However, that is not always true, and false patrol speed signals could be locked onto and tracked if another signal from, for example, a truck with a large radar cross section is the strongest signal in the spectrum. In other words, the fact that a radar return signal is the strongest signal in the spectrum does not guarantee that it is from a stationary object and represents the patrol speed.

To resolve that ambiguity, radars like the Kustom Eagle series use complicated digital signal processing to examine the shape of the Fourier component spectrum around the peak which the radar thinks is the patrol speed return from a stationary object. Patrol speed returns typically have an asymmetrical shape around the peak, and the Eagle series radars took advantage of this fact by examining the shape of the spectrum around each peak which is suspected of being a patrol speed return to determine if the characteristic asymmetric shape was present. This complicates the software unnecessarily and increases the cost to design it, and is not foolproof anyway. Further, it is hardly worth using this methodology since it does not help in many cases.

Another problem with deriving the patrol speed from radar returns is that when the patrol car comes to a stop. Typically, after a patrol speed return from a stationary object is found, the radar tracks that return even at a lower amplitude to maintain continuity due to traffic in the antenna beam that reduces the reflected return from stationary objects. Problems arise however when the police vehicle comes to a stop, and the lock on the patrol speed return is lost. The software of these prior art radars goes into a search mode when lock is lost on the patrol speed return in an attempt to find a new patrol speed return. The radar will then often lock onto a return from another vehicle instead of a return from a stationary object and will conclude that the speed of that other vehicle is the patrol speed.

This is called "shadowing" and frequently occurs when a patrol car has its radar operating in moving mode and pulls to a stop at a stop sign behind another car. When the other car takes off from the stop sign, the radar will often lock onto the speed of that car as the patrol speed and fail to lock onto the actual patrol car speed when the patrol car starts moving again.

When the patrol car is stopped, the radar needs to be manually switched into stationary mode to prevent this "shadowing problem" from happening. When the patrol car starts moving again, the radar must be manually switched back to moving mode. This is inconvenient to the officer, and if he forgets, a bad patrol speed can be locked which leads to errors in the tickets he writes.

Early attempts to use speedometer interfaces to find patrol speed are represented by U.S. Pat. No. 4,335,382 to Brown and assigned to Decatur. That patent taught a traffic radar system in which the speed of a target vehicle is determined by measuring the difference in frequency between a component of a doppler signal which has a frequency proportional to the relative speed of the target vehicle and a moving patrol vehicle and a reference signal having a frequency proportional to the speed of the patrol vehicle. The reference signal is developed from a tachometer device which generates a periodic signal having a frequency proportional to the rotational speed of a vehicle wheel and phase-locked loop arrangements including adjustable dividers are provided for locking an oscillator to the tachometer signal and generating a reference signal at a frequency proportional to the actual speed of the patrol vehicle. For calibration, a component of the doppler signal produced from reflections from stationary objects is used.

More recently, Kustom Signals obtained U.S. Pat. No. 6,023,236 for Speedometer Assisted Patrol Speed Search For DSP Traffic Radar. This patent demonstrates an operator sequence to synchronize the speedometer input to the radar return. Synchronization is typically done upon initial installation or when the radar is moved to another vehicle.

In U.S. Pat. No. 5,525,996 owned by the assignee of the present patent application and covering the Stalker Dual, a method of automatically rejecting the patrol speed determined from the ground return on the basis of too high a difference from a speed determined from a speedometer interface was taught. Specifically, the '996 patent taught, "The DSP also has an optional speedometer interface 424 in some embodiments through which the DSP can read the actual patrol car speed for purposes of comparing this speed to the "patrol speed" derived from the radar returns of stationary objects. The software of Appendix 1 does not use the actual speedometer speed as the patrol speed because this is not accurate enough. Instead, the patrol speed is derived from the Doppler shifted radar returns from the ground. This is done by using the strongest radar return over time and assuming this is the return from the ground. Basically, the ground return is usually the strongest radar return although when targets get close, their returns become stronger for a short time than the ground return but then the target return goes away altogether. The software therefore assumes that the strongest return over an interval which is longest enough to distinguish over transitory target returns, is the return from which the patrol speed is derived. The software also includes the ability to compare the calculated patrol speed from the return selected in the above described manner to the speed read from the speedometer, and, if the difference is greater than 3 MPH, to discard the calculated patrol speed and re-calculate it from a different radar return.

None of these prior art attempts was completely satisfactory. Therefore, a need has arisen for a process and apparatus to use speedometer pulses to steer the DSP search for a patrol speed which automatically calibrates itself on every powerup and does not need to have a speedometer input to operate so that it can be moved from a car with a speedometer output to a car without a speedometer output with no setup needed.

SUMMARY OF THE INVENTION

The invention is a process and apparatus for using speed pulses from a speedometer to steer a search by a digital signal processor on an Fourier transform based police Doppler radar to find the correct patrol speed from stationary object returns. The system automatically calibrates itself (finds the correct ratio between speed sensor output frequency and true vehicle ground speed) so that it can be moved easily from one car to another with different speed versus frequency characteristics of their speedometers. No human input is needed of any sort to complete this automatic calibration process.

Further, in some embodiments, the radar can also operate like the prior art radars to find the ground speed without any speedometer input at all. If installed in a car with no speedometer output coupled to the radar, this fact is automatically sensed, and the police Doppler traffic radar operates as all prior art DSP Doppler radars and finds the ground speed without any software window that limits the ground speed search.

No setup is needed when moving the unit from a car with no speedometer output to a car with a speedometer output. Calibration of speedometer frequency to vehicle speed is automatic and neither requires operator entered configuration data nor any other operator input.

The system also senses when the patrol car is moving and automatically switches the radar from stationary mode to moving mode. When the car stops, the system automatically switches the radar back from moving mode to stationary mode to prevent the shadowing problem.

A broad description of the calibration process of the invention is:

a) reading at least one signal frequency output from a vehicle speed sensor to a police Doppler traffic radar, and obtaining from the Doppler police traffic radar what the traffic radar thinks is the correct ground speed calculated from the reflected signal from a stationary object at the time the signal frequency from said vehicle speed sensor is read;
   b) repeating the process of step a) multiple times and storing the data;
   c) automatically determining the reliability of the ratio without any input from a human being needed by evaluating over time one or more factors which are indicative that said police Doppler traffic radar has locked onto and is tracking the correct ground speed including at least persistence of the same ratio for a plurality of different ground speeds obtained from said police Doppler traffic radar; and
   d) when the reliability of the ratio has been adequately established, storing the ratio so determined to be accurate in a memory for use by said police Doppler traffic radar in calculating the speed of moving targets when searching in moving modes.

The process carried out by the invention to use the ratio determined by the automatic calibration process to steer the ground speed search by the radar is comprised of the following steps:

a) when the reliability of the ratio has been adequately established, storing the ratio so determined to be accurate in a memory for use by said police Doppler traffic radar in calculating the speed of moving targets when searching in moving modes;
   b) calculating an approximate ground speed by reading said ratio stored in said memory and multiplying said ratio times the frequency received from a vehicle speed sensor;
   c) using said approximate ground speed calculated in step b) to establish and limit the range of speeds to be searched by said police Doppler traffic radar for a ground speed; and
   d) searching the range of speeds established in step c) for the strongest reflected radar signal and setting the ground speed equal to the speed which corresponds to the frequency of said strongest reflected radar signal.

The overall process carried out by the invention is as follows:

a) automatically determining whether a police traffic radar is installed in a Vss equipped car, and monitoring for any nonzero frequency at an input of said police Doppler traffic radar that would be coupled to a speed sensor if the vehicle was Vss equipped;
   b) if a conclusion is drawn that the traffic radar is being used in a vehicle which is not Vss equipped, finding ground speed in a conventional manner without use of any ground speed search window steered using data derived from a vehicle speed sensor;
   c) if a conclusion is drawn that the traffic radar is installed in a vehicle which is Vss equipped, monitoring the frequency received from the vehicle speed sensor, and causing automatic switching of said police traffic radar from moving mode to stationary mode when the vehicle is not moving and automatic switching from stationary mode to moving mode when the vehicle begins to move; and at least once after power is first supplied to said police Doppler traffic radar and said radar is turned on, performing the following steps to implement an automatic calibration process to determine the correct ratio between frequency supplied from said speed sensor:

d) reading at least one signal frequency output from a vehicle speed sensor to a police Doppler traffic radar, and obtaining from the police Doppler traffic radar what the traffic radar computes is the correct ground speed calculated from the reflected signal from a stationary object at the time the signal frequency from said vehicle speed sensor is read;
   e) repeating the process of step d) multiple times and storing the data;
   f) automatically determining the reliability of the ratio without any input from a human being needed by evaluating over time one or more factors which are indicative that said police Doppler traffic radar has locked onto and is tracking the correct ground speed including at least persistence of the same ratio for a plurality of different ground speeds obtained from said police Doppler traffic radar;
   g) when the reliability of the ratio has been adequately established, storing the ratio so determined to be accurate in a memory for use by said police Doppler traffic radar in calculating the speed of moving targets when searching in moving modes; and after said ratio has been determined to be reliable, performing the following steps each time a moving mode search is to be performed by said police Doppler traffic radar:

h) calculating an approximate ground speed by reading said ratio stored in said memory and multiplying said ratio times the frequency received from a vehicle speed sensor;
   g) using said approximate ground speed calculated in step h) to establish and limit the range of speeds to be searched by said police Doppler traffic radar for a ground speed return; and g) searching the range of speeds established in step g) for the strongest reflected radar signal and setting the speed that corresponds to the frequency of said strongested reflected radar signal as the ground speed for use in calculating the actual speed of a moving target whose relative speed was determined in a moving mode target search.

The apparatus of the invention comprises any digital signal processing based Doppler traffic radar programmed to perform the processes described above.

DETAILED DESCRIPTION OF THE PREFERRED AND ALTERNATIVE EMBODIMENTS

Figure 1:
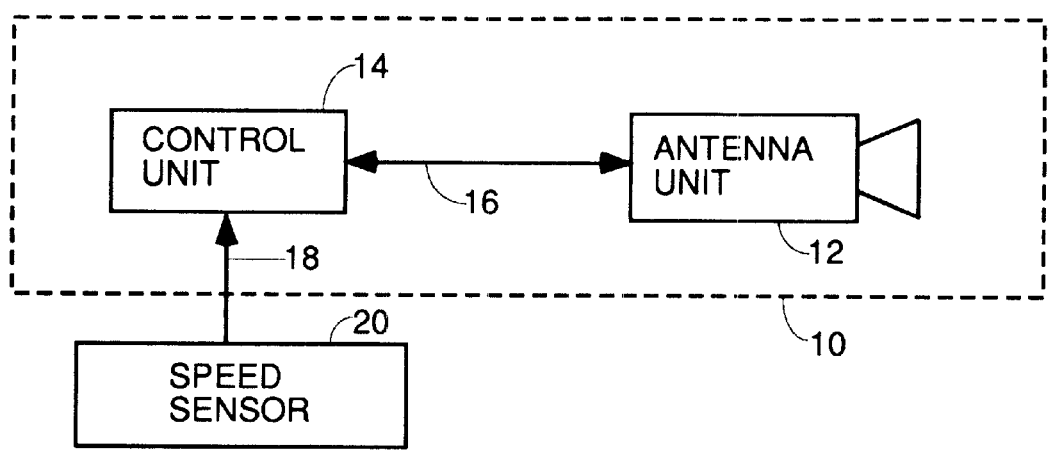
FIG. 1 is a block diagram of a generic police radar representing the class of police radars in which the improvement to automate mode switching and restrict the patrol speed search can be made.

Referring to FIG. 1, there is shown a block diagram of a generic police radar representing the class of police radars in which the improvement to automate mode switching and restrict the patrol speed search can be made. In the preferred embodiment, the invention is implemented in a digital signal processor based Doppler radar where a Fourier Transform is done of the reflected radar signals. However, the invention is applicable to any Doppler police radar which finds the patrol speed by examining the reflected radar signal from stationary objects and where the search for the patrol speed can be steered by the result from the speedometer frequency calibration process and the mode of the radar can be switched from stationary to moving based upon the presence or absence of a frequency at the speedometer input.

The improved radar of the invention is shown at 10 as comprised of an antenna unit 10 which transmits radar energy and received reflected radar energy. In some radars, this antenna is separated from the main control unit 14 by a cable 16, but in other radars such as the Stalker, the antenna unit is integrated as part of the main control unit 14. In some radars within the class, the antenna unit has the local oscillator that generates the radar signal, a turnstile and mixing diodes and an analog-to-digital converter in the antenna unit to mix the reflected received signal down to audio, sample it and send it as a digital signal to the main unit 14 over cable 16. Examples of such a radar are the Stalker Dual and certain radars manufactured by Decatur. Other radars such as the Kustom Eagle series are not believed to digitize the reflected, received signal at the antenna unit and digitization is done at the main unit 14.

The main control unit 14 may have a digital signal processor (DSP) which does the Fourier transform on the digital samples of the reflected signal and a separate microprocessor which does control interface, mode control and display functions. An example of such a radar is the Kustom Eagle series. The DSP is programmed to do the target searching and searching for the patrol speed. In some radars, the DSP not only does the searching but also does the control interface to receive user input from the keyboard (not shown) or remote control (not shown) and display results on displays (not shown) which may be on the main unit 14 or on a separate control console or remote control coupled to the main unit by a cable or infrared or RF link.

The main control unit has an input 18 coupled to receive electronic pulses from the vehicle's speed sensor 20 in Vss equipped cars. Vss stands for vehicle speed sensing, and it means that the vehicle has an electronic output upon which a frequency appears which is proportional to the frequency speed. This does not necessarily have to be from a speedometer. It can be from a separate radar which is pointed only at the ground, or any other relatively reliable ground speed source independent from the traffic radar.

The details of the electronic circuitry of the control unit 14, any display and control consoles therefor and the antenna unit 12 are not critical to the invention so long as the functions described herein can be performed in either digital or analog circuitry to steer the patrol speed search based upon the frequency on line 18 and an automatic calibration of the speed versus frequency ratio that is performed without operator intervention. In the preferred embodiment, the invention also includes automatic mode switching from stationary to manual mode and vice versa based upon whether or not any frequency above zero is being received on line 18.

Figure 2:
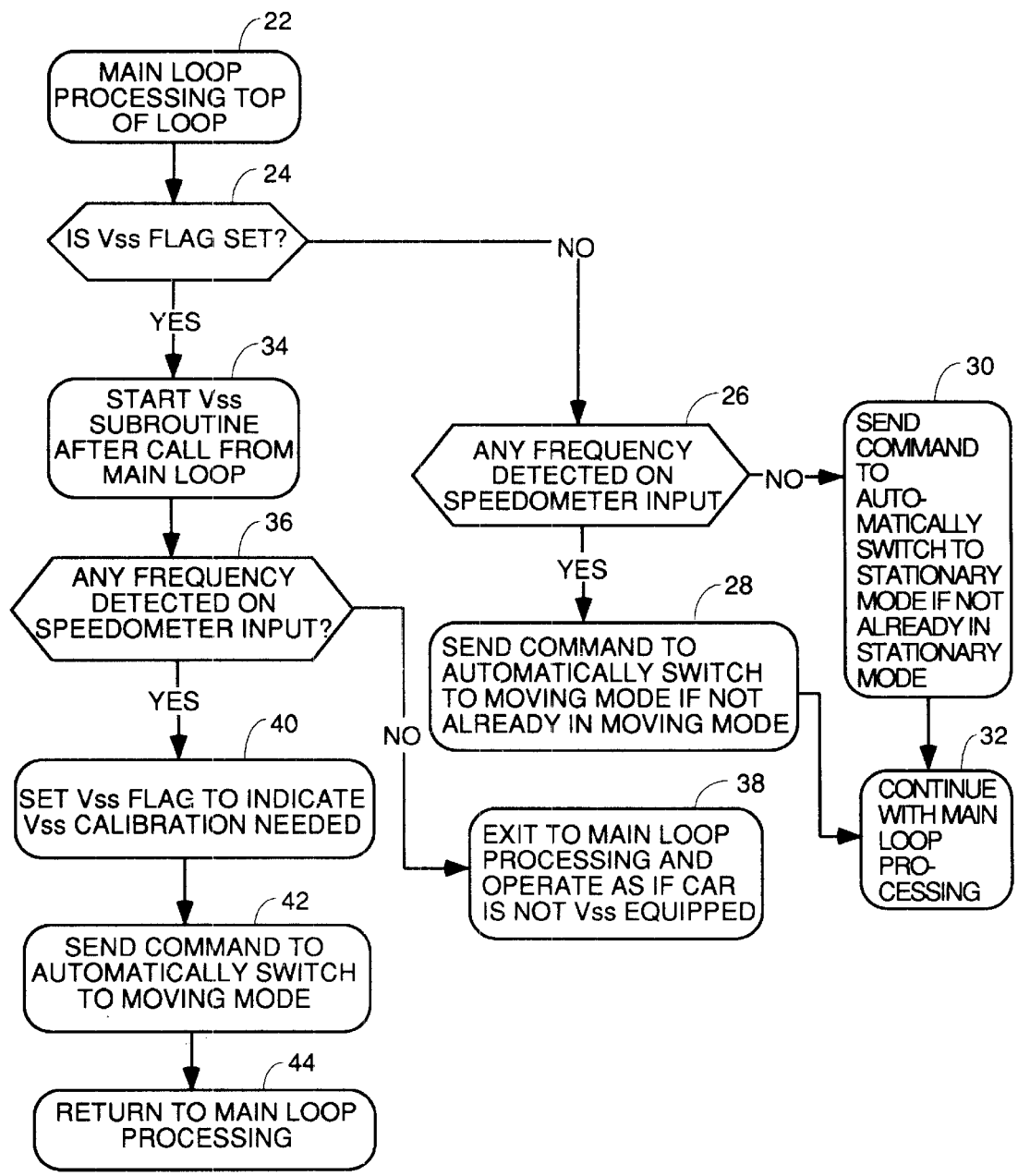
FIG. 2 is a flowchart of an alternative embodiment of the process that is carried out as a subroutine, or part of the processing of the main loop of the DSP to determine whether the radar is to operate in Vss automatic mode switching mode or not.
Figure 3A:
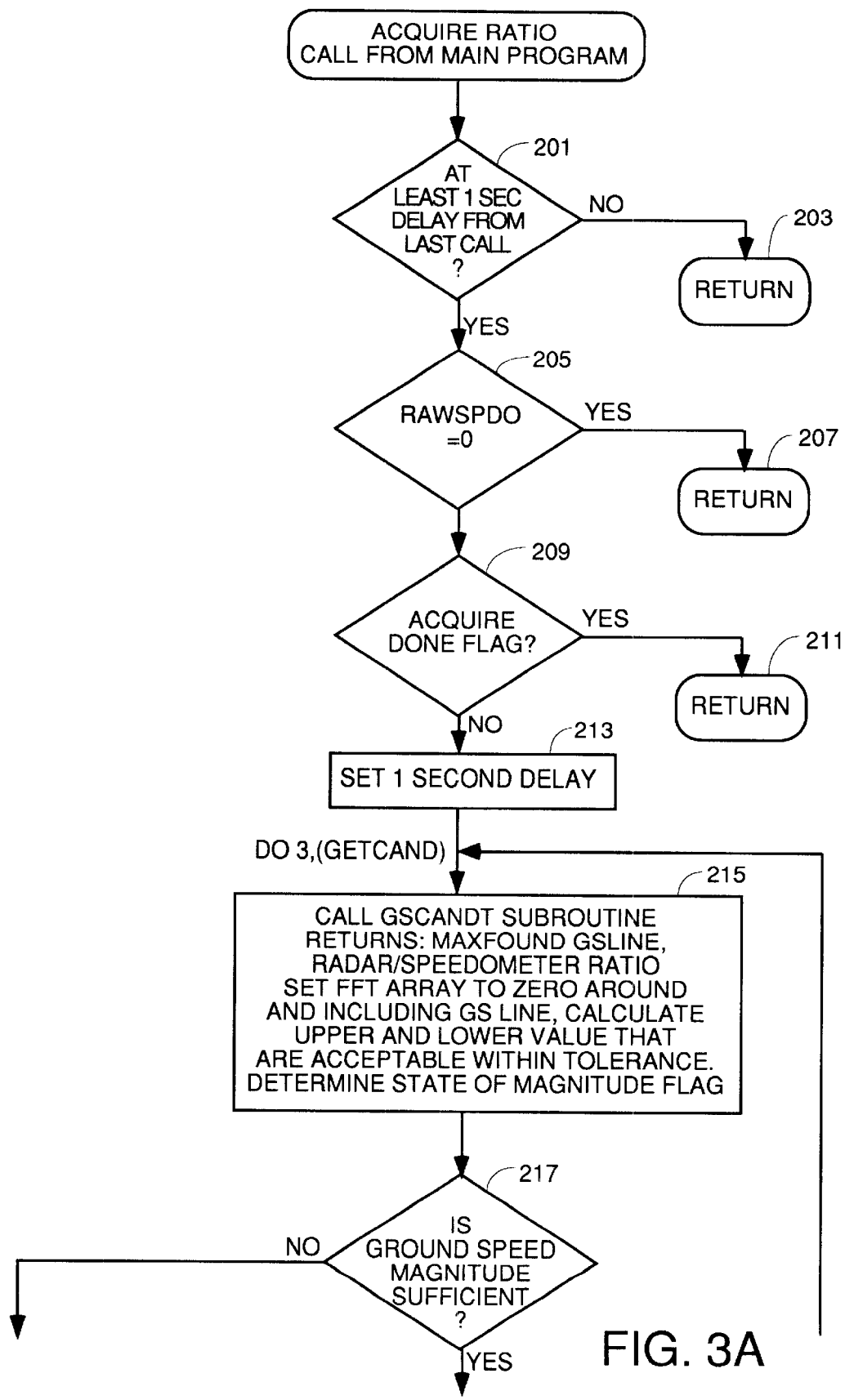
FIGS. 3A through 3F is a flowchart for the preferred embodiment of an automatic calibration process which determines a valid ratio for the speedometer frequency versus speed.
Figure 3B:
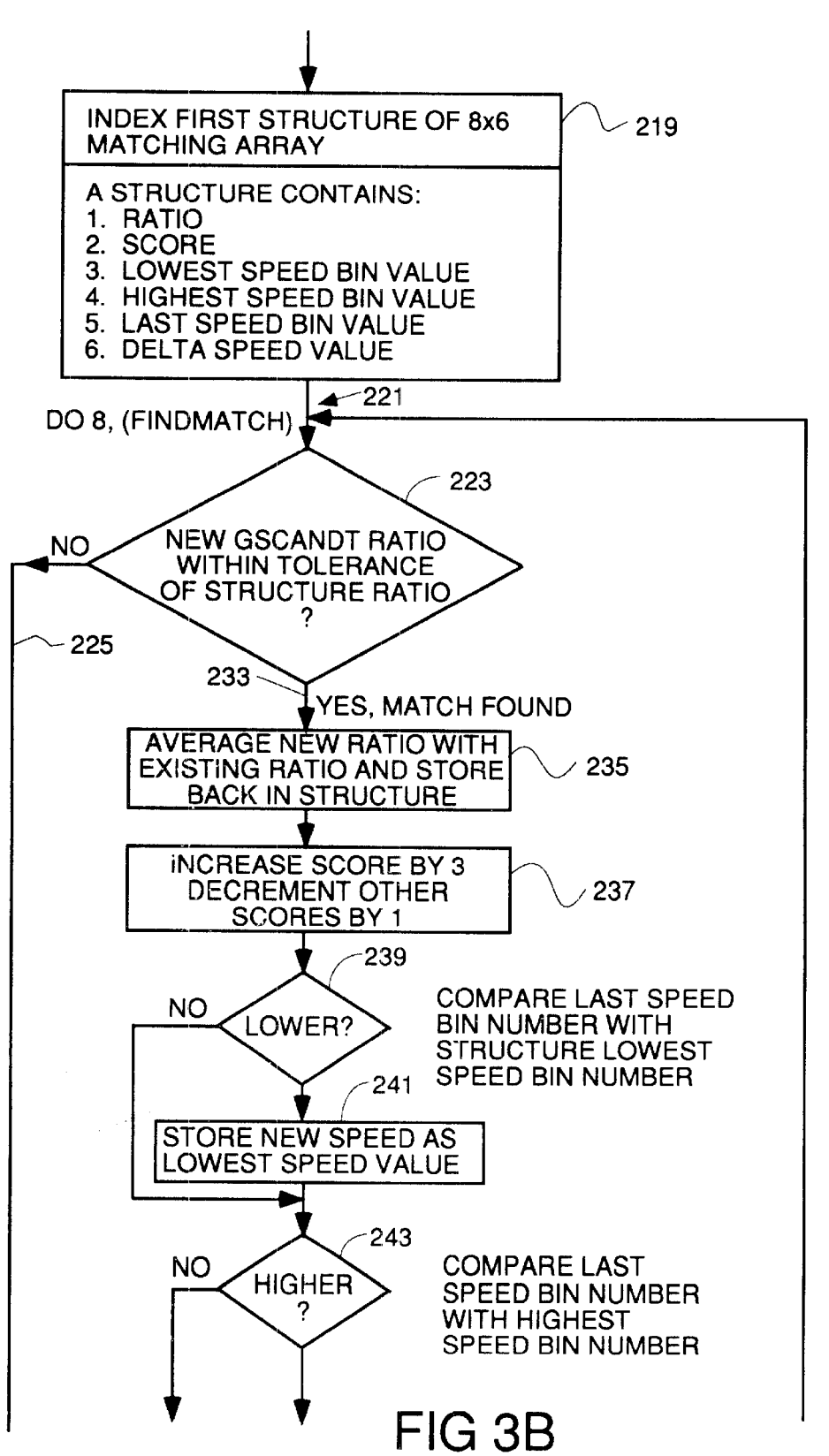
Figure 3C:
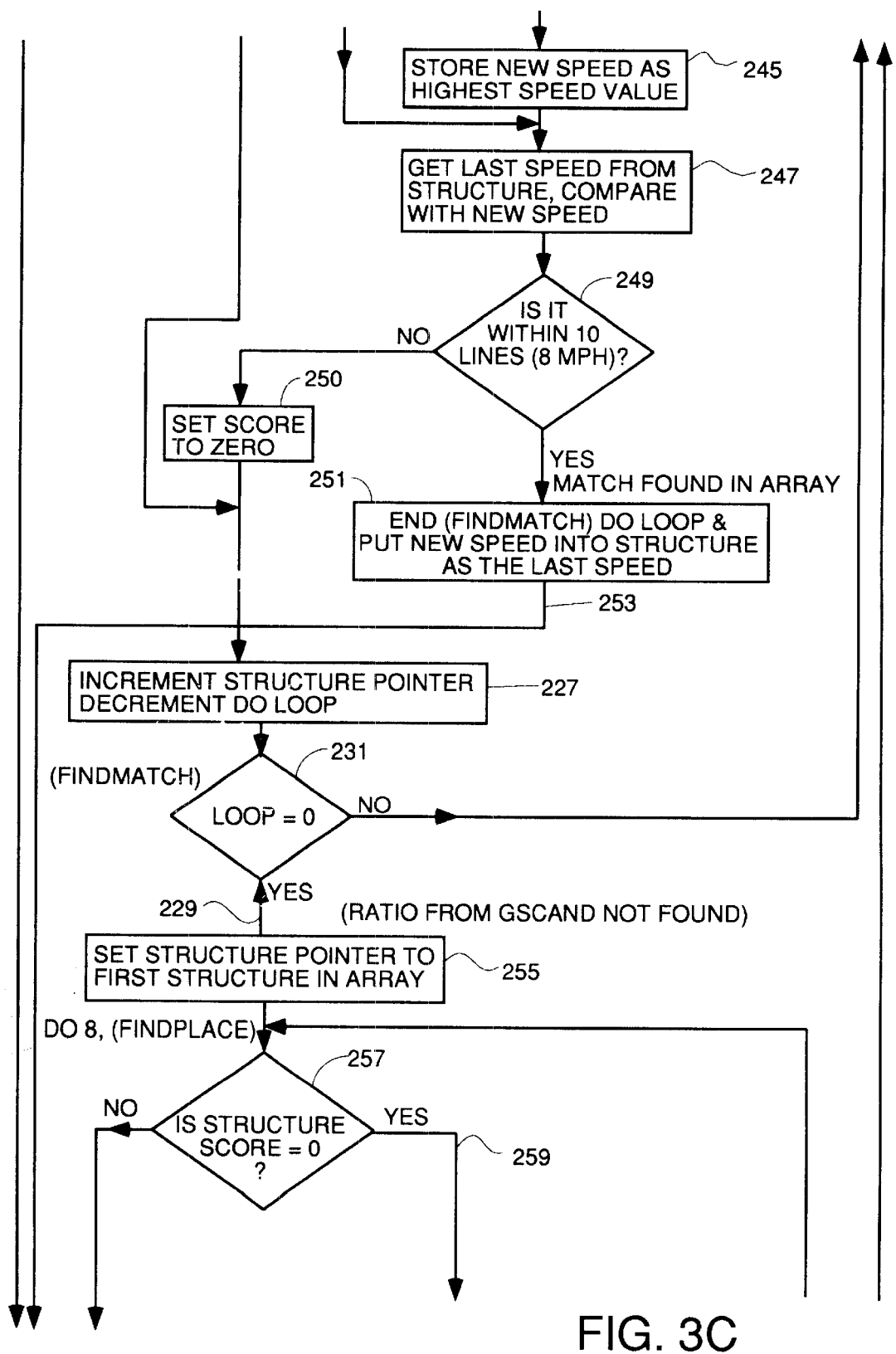
Figure 3D:
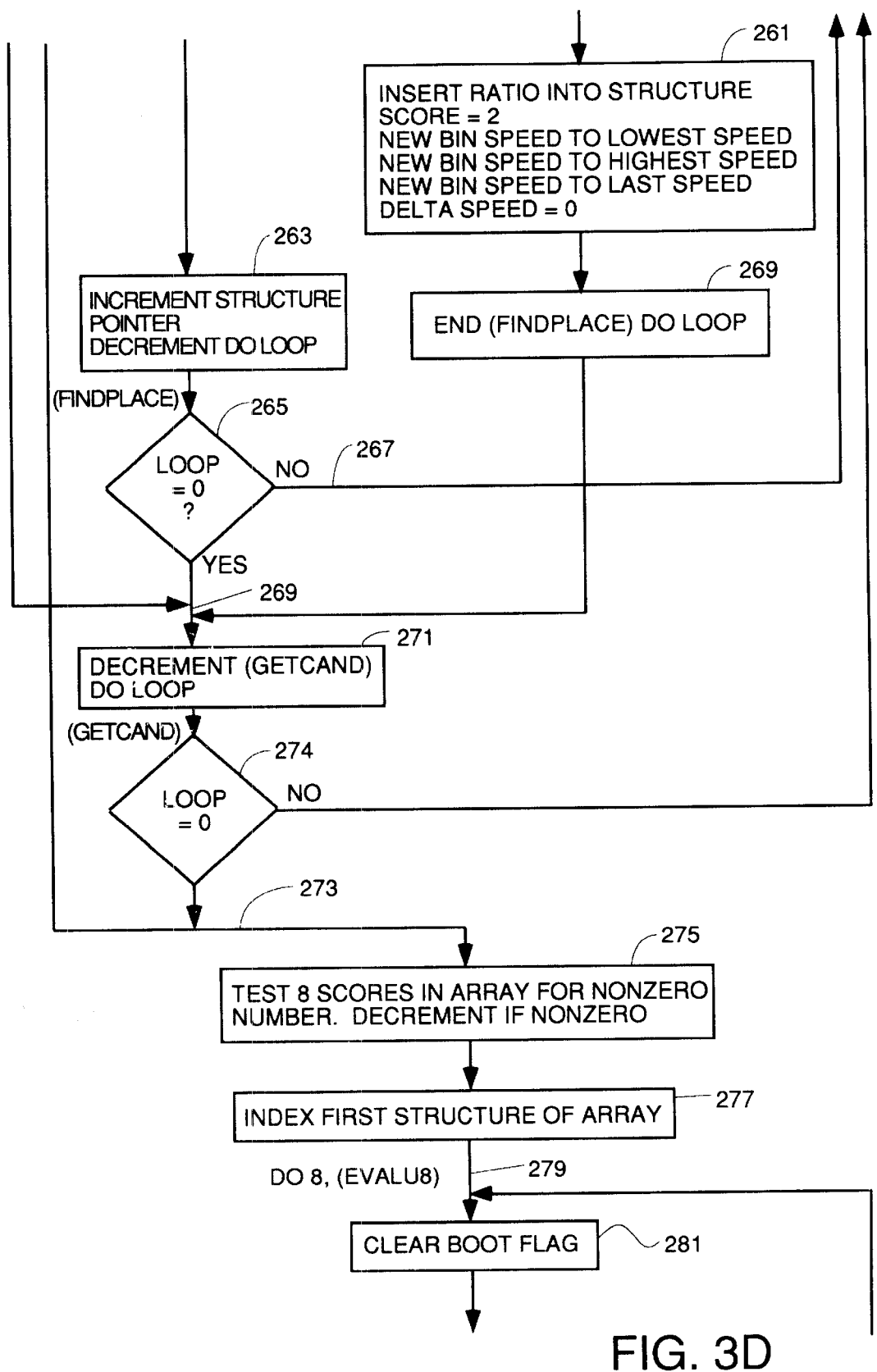
Figure 3E:
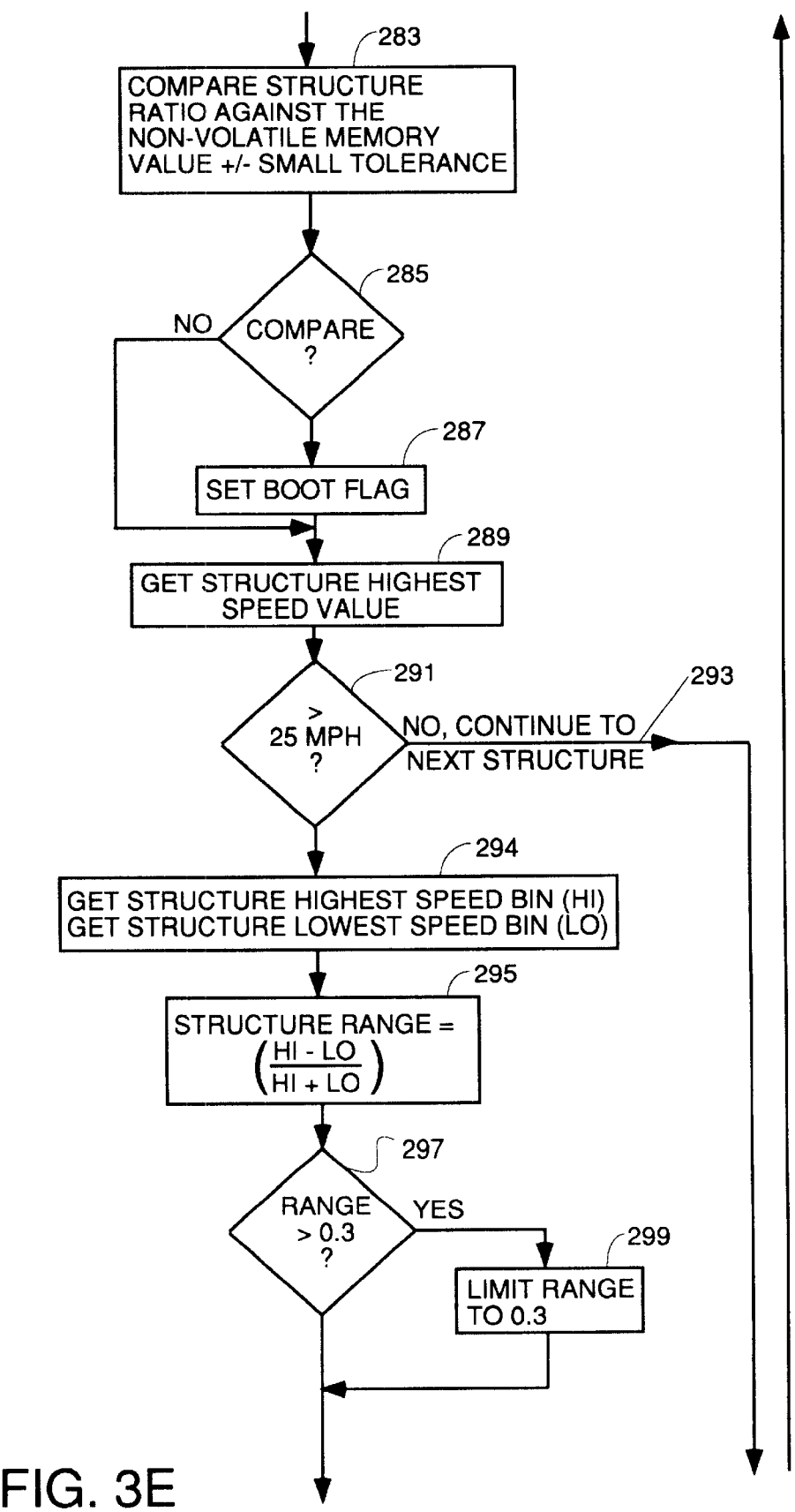
Figure 3F:
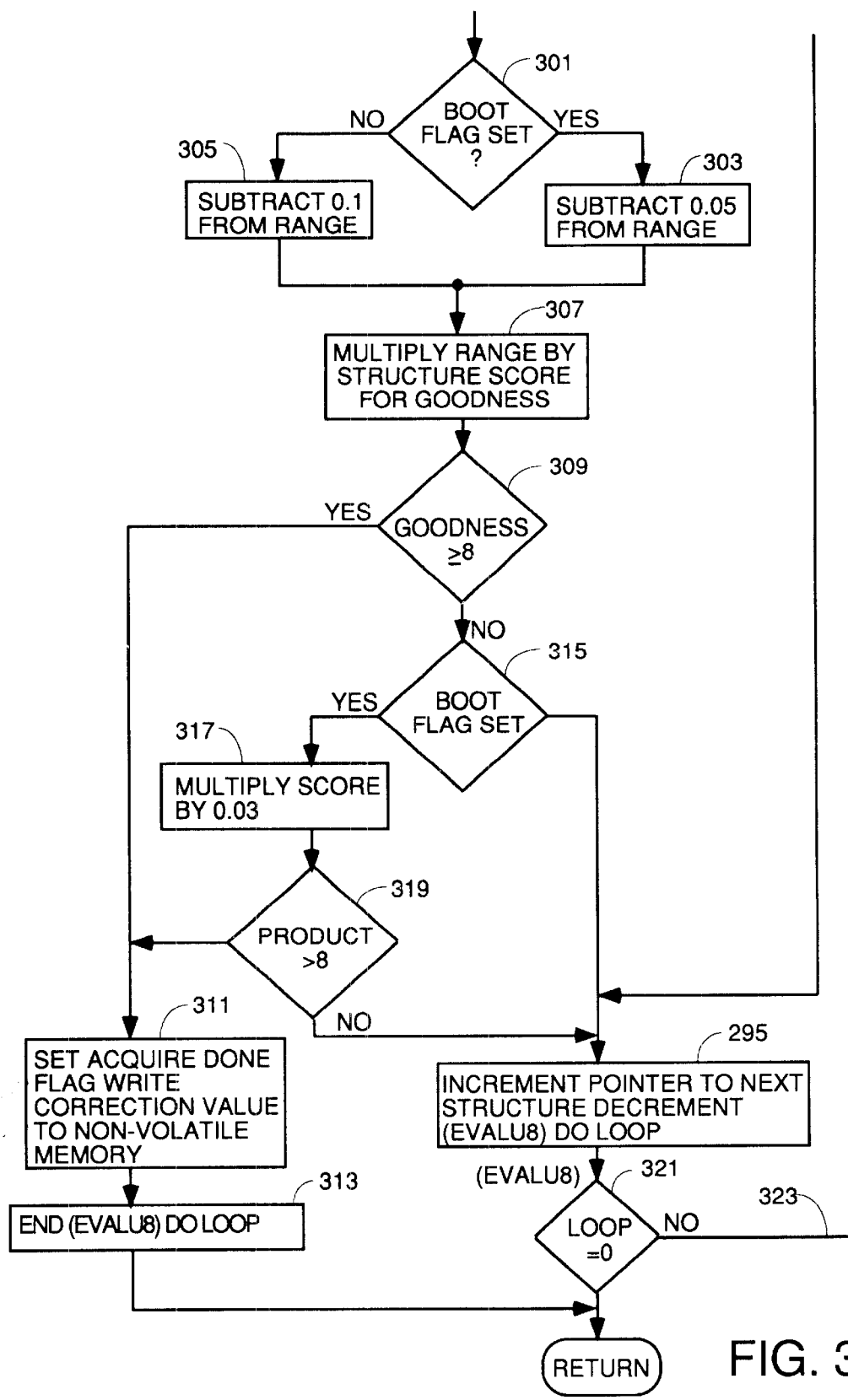

FIG. 2 is a flowchart of an alternative embodiment the process that is carried out as a subroutine or part of the processing of the main loop of the DSP to determine whether the radar is to operate in Vss automatic mode switching mode or not. The advantage of having a function like that disclosed in FIG. 2 in the radar is that the radar may be installed in a car which does not have a speedometer output, and the function of FIG. 2 will determine that the Vss routines should be skipped and the radar should operate as a conventional radar. This happens automatically without any input from the operator to configure the radar. To accomplish this feature, the routine of FIG. 2 generally functions to monitor the Vss input on line 18 to determine if any frequency is detected, and, if not, causes the radar to operate as a conventional radar. If at any time, a frequency is detected, a Vss flag is set, and when the main loop reaches the point of reading this flag, it branches off to processing to monitor the frequency on line 18 and do automatic switching of modes based upon what was detected.

Specifically, in FIG. 2, the top of main loop processing is symbolized by block 22. Although the process of FIG. 2 does not have to occur at the top of the main loop, it is shown in FIG. 2 as being placed there since that is the most logical place to put it. Test 24 reads a Vss flag and determines if it is set or not. Test 24 and the steps following it are performed every time the DSP returns to the top of the main loop, so test 24 and the subsequent steps will be performed many times per second.

If the Vss flag is not set, it means that the patrol car has a speedometer output, that output is coupled to the radar and that, at some time in the past since the radar was powered up, the patrol car moved and a nonzero frequency was detected on line 18. If test 24 determines the Vss flag to be not set, processing branches to test 26 to determine if pulses of any non-zero frequency are currently being received at the speedometer input. If pulses of any non-zero frequency are detected, processing branches to step 28 where a command is sent or other processing is accomplished to force the DSP target searching process to go into moving mode so that subsequent target searches will search in moving mode. This means that a search will also be performed for the patrol speed in addition to a search for the target's relative speed, and the patrol speed and the target's relative speed will be correctly combined with the patrol speed to derive the target's actual speed. The patrol speed search will be a conventional search until the calibration process of FIGS. 3A through 3F is completed, and, thereafter, will be a patrol speed search which is limited to searching within a window of speeds around the patrol speed derived from the frequency of pulses received from the speedometer.

The processing of block 28 is any processing which is suitable to cause the mode switch if necessary. For example, the command to switch modes can be issued without first checking if the radar is already in moving mode, or, a check can be made to determine in which mode the radar is operating first, and then, if operating in stationary mode, appropriate processing to force an automatic switch to moving mode is accomplished.

If test 26 does not detect a pulse train of any non-zero frequency on the speedometer input, the processing of block 30 is performed. Block 30 represents processing to force transition of the DSP into stationary mode target searching. Like block 28, block 30 represents any processing that can force the transition including checking first to determine if the radar is already in stationary mode and forcing the transition only if the radar is operating in any moving mode or simply issuing a command to transition to stationary mode regardless of what mode the radar is already in. Block 32 represents the continuation of whatever main loop processing is next after the mode switching processes of either blocks 28 or 30.

If test 24 determines the Vss flag is set, it means the radar has not previously drawn a conclusion that the patrol car is Vss equipped. In this case, the process must determine if the radar is installed in a car with a speedometer output and whether the car is moving. That process starts at block 34. Test 36 measures the frequency of any pulse train or other signal coming in at the speedometer input. If the patrol car is not Vss capable, or if it is Vss capable but is not moving at the time test 36 is done, test 36 will detect a zero frequency at the speedometer input. This will cause processing to vector to block 38 where exit to the main loop occurs, and processing then continues with whatever processing is next in the main loop after return from the Vss subroutine. This causes the radar to operate, at least for this pass through the main loop, as if it is installed in a non-Vss car and find the patrol speed in a conventional manner. Although the Vss processing of FIG. 2 is indicated as a subroutine, it can also be inline processing in the main loop.

If test 36 determines that some non-zero frequency was detected on the speedometer input, processing of step 40 is performed next to set the Vss flag. Next, step 42 is performed to do the appropriate processing to force an automatic switch to moving mode. Finally, step 44 is performed to return to the main loop processing.

Referring to FIGS. 3A through 3F, there is shown a flowchart for the automatic calibration process which determines a valid ratio for the speedometer frequency versus speed. This automatic calibration process is done once for every powerup cycle, and is not done again thereafter until the next powerup. This means that the radar can be moved to a different vehicle which has a different increase in frequency for every one mile-per-hour increase in vehicle speed without hindering the radar's ability to accurately find the patrol speed and eliminate the shadowng problem. The basic idea of the process of FIGS. 3A through 3F is to build an array of several ratios calculated from observed frequencies on the speedometer input to current ground speed. Each ratio is given a "goodness" score, and the higher the goodness score is, the more likely the ratio is to be the correct ratio. Goodness scores are incremented for persistence of a ratio, i.e., the amount of time the same ratio is observed. Goodness scores are also incremented for consistency of the ratio over a wide range of speeds. When a ratio has achieved a goodness score of higher than 8, it is deemed to be the correct ratio, and an Acquire Done flag is set indicating to the DSP software that it now should start searching for the patrol speed (referred to as the ground speed in the terminology of the flowchart) within a software window centered around the speed calculated from the ratio with the high goodness score derived by the process of FIGS. 3A through 3F. There follows a detailed description of the processing steps of FIGS. 3A through 3F.

Acquire_Ratio Subroutine

This subroutine is called from the main program loop in moving mode after the Ground Speed FFT array has been constructed and this FFT array is not needed further by the Ground speed search and tracking routine.

Acquire_Ratio tests for a 1 second elapsed time, step 201, and returns if 1 second has not elapsed, step 203. Variable RAWSPEDO (the frequency on the speedometer input) is tested for 0, step 205, and subroutine returns if radar is stationary, or moving at low speeds, step 207. RAWSPEDO is a number generated from dividing a count of external signal pulses at the speedometer input by the interval of time between them over a certain period (2 seconds or less) of time.

Next, a test of a flag (ACQUIRE DONE) is made, step 209, to determine if the acquisition has been made for this particular power-on cycle of the radar. If it has been made, the subroutine returns, step 211. In such a case, further Acquire_Ratio tests are made until the radar has been turned off and powered back on. A new power-on cycle will clear the Acquire_Done flag, enabling a new Acquire_Ratio measurement to be made.

Acquire_Ratio proceeds and sets a timer, step 213, for the next 1 second execution.

A DO loop to getcand of 3 counts begins at step 215.

A subroutine GSCANDT to find a Ground Speed Candidate is called at step 215. GSCANDT searches the Ground Speed FFT array for the strongest signal between the FFT bin speeds of approximately 20 mph and 80 mph. It returns the maximum amplitude Fourier component in that speed range as the found Spectral bin number called Maxfound GSLINE (bin number is mapped to the frequency of the Fourier component stored in that bin), the computed ratio of radar speed/speed sensor frequency (the center value), the maximum value of that ratio (center value+small tolerance) and the minimum value of that ratio (center value−small tolerance). It also forces the magnitude at the candidate bin number to zero in the FFT array as well as forcing the magnitude of the lines stored at a number of bins above it and below it to zero. This is so that a second or third call to GSCANDT will not come back with the same answer.

The Ground Speed candidate found by GSCANDT in step 215 is tested for minimum magnitude level and is rejected if not of sufficient magnitude, step 217.

The ratio matching array which will be used to store ratios, their goodness scores, and speed data for each is a 8×6 element data array which can be visualized as a table with 8 rows, each with 5 columns for 5 different parameters, i.e. it can hold 8 different ratios and the 5 parameters associated with that ratio which characterize its reliability as the correct answer. The 6 parameters form a record which is referred to in the flowchart as a structure. Each structure is comprised of the ratio radar speed/sensor speed, an accumulated time score (persistence value) of that particular ratio, the lowest radar speed detected which had that ratio (lowest FFT bin number of that ratio), the highest radar speed detected which had that ratio, the present radar detected speed that has that ratio, and the largest speed difference between different speeds both of which had that ratio.

The pointer to the first 6 element structure is initialized in step 219.

A DO loop to execute a findmatch routine 8 times begins at step 221. What this routine does is find a match if possible between the ratio just detected and one of the ratios previously stored in one of the structures of the array.

Minimum and maximum values of the candidate ratio calculated from the current frequency at the speedometer input and the current radar detected ground speed are compared in step 223 to the existing ratio in array at the location of the pointer. If no match is found, branch 225 is taken to step 227 where the pointer is incremented to the next ratio structure until all 8 ratios have been tried where findmatch ends by taking branch 229 out of test of the remaining loop count in step 231.

If a match is found, branch 233 is taken to step 235 where the new ratio is averaged with the ratio in the structure and stored back into that structure. The score in the structure is then increased by 3 in step 237. Farther down the array all non-zero scores are decremented by one in step 237 so this is a gain of two counts for that ratio score.

Step 239 decrements the new speed bin number (last speed bin number) with lowest speed bin number in structure currently pointed to by the pointer. If the comparison of step 239 indicates the new speed number is lower, the new speed is stored as the lowest speed bin value in the structure currently pointed to in step 241. This process provides updated information regarding the range of speeds that had this ratio. The range of speeds which had the same ratio is used in the preferred embodiment to calculate its goodness number. The goodness number is increased when a number of different speeds have the same ratio because the radar speed found is more likely to be the correct ground speed derived from a stationary return and not a radar detected speed from some moving target which would give a false ground speed.

In step 243, the new speed bin number is compared with the highest speed bin number in the structure to which the pointer currently points. If the new speed number is higher, step 245 stores the new speed as the new highest speed number that had this same ratio.

Next, step 247 compares the new speed bin number against the last speed number in the structure for this ratio. This step helps to evaluate the persistence of the ratio. If the new speed bin number is not within 10 lines (about 8 mph), as tested in step 249, then the new speed which generated the ratio which matched the ratio currently pointed to is probably not the true ground speed and is the speed of some moving target. In that case, step 250 sets score to zero and then step 227 increments the pointer. Step 231 then checks to see if the number of passes left through the DO loopis a nonzero number. and, if not, returns to step 223 on FIG. 3B to look at the next ratio structure and repeat the processing of steps 223 through 249. If the new speed is within 10 MPH, of the last speed, step 251 is performed to exit the findmatch DO loop and add the new speed into the structure as the last speed to replace the current last speed. Steps 247, 249, 250 and 251 are persistence checks to determine how long the same ratio has been prevailing for the current radar found ground speed being processed. The reason for this check is to cover the case where this ratio was present for some time, disappeared, and then reappeared. When this ratio re-appeared, if the new speed and the last speed differed greatly, there is a possibility that this match to an existing ratio in the structure is in error. Otherwise the software puts the new speed bin number into structure as the last speed, and ends the (findmatch) DO loop in step 251. Exit to (getcand) loop via path 253 is then executed.

If the attempt to find a match ends after scanning through the array with no match, the software process attempts to find a place in a structure that has a score of zero (meaning that any data in this structure is invalid and this spot in the structure can be used to start a new ratio scoring). Steps 255 and 257, respectively, set the pointer to the top of the structure in a DO loop and test the score to see if it is zero of the structure to which the pointer points. If it finds a structure with zero score, path 259 is taken to step 261 which inserts the new ratio into the structure, sets the score to 2, sets new bin speed to lowest bin speed, sets new bin speed to highest bin speed, sets new bin speed to last bin speed, and zeros the delta speed field so as to set up the new ratio for subsequent scoring. Step 269 is then performed to exit the DO loop. Steps 263 and 265 are executed if test 257 does not find a zero score at the current structure location to increment the pointer, see if the entire array has been checked and vector processing back to step 257 via path 267 is the entire array has not yet been searched.

After finding a place for the new ratio or searching the whole array in vain, the (findplace) DO loop inside the outer getcand DO loop is ended at path 269 and the outer (getcand) DO loop is tested in steps 271 and 273 to see if the three executions thereof have been completed. If the three executions of the getcand DO loop have not been completed, test 273 vectors processing back to step 215 where another pass through the getcand loop starts by looking up the current strongest candidate ground speed found by the radar (maxfound GSLINE) in the range between 20 and 80 MPH and computing its ratio and looking for a match for this ratio in the array.

If three passes through the getcand DO loop have been completed, processing vectors on path 273 to step 275 to test the 8 scores in the array for a non-zero number and decrement all non-zero scores. In other words, following 3 passes through the (getcand) DO loop to obtain the three ground speed candidates, all non-zero scores are decremented so that without an update, a structure will eventually if not immediately become available for data on a new ratio when a score gets decremented to zero.

Step 277 then sets a pointer to the first structure in array. A DO loop (evalu8) of 8 counts then begins at 279.

A BOOT FLAG (referencing non-volatile memory which stores the last ratio acquired by the calibration process of FIGS. 3A through 3F) is cleared in step 281. The structure ratio pointed to by the current pointer is compared in step against the last acquired ratio stored in the non-volatile memory to determine, with a small tolerance value, if there is a match.

If they compare and are a match in step 285, the BOOT FLAG is set in step 287.

Step 289 then reads the structure's highest bin speed value and test 291 compares the highest bin speed value against 25 mph. If it is not at least 25 mph, path 293 is taken to step 295 to increment the pointer to point to the next structure and decrement the evalu8 DO loop loop counter so as to continue to next structure.

If the highest bin speed of the structure currently pointed to is found by test 291 to be greater than 25 MPH, the software, in step 293 reads the structure's highest speed bin number (HI) and its lowest speed bin number (LO) for purposes of calculating a range. The higher the range is for a given ratio, the more likely it is to be the correct ratio because the ratio stayed constant as the radar located ground speed changed. This is a characteristic of the true ground speed and not a characteristic that is found when the radar is locked onto a return from a moving target.

Step 295 computes the range of the ratio in the structure currently pointed to. The range is equal to the following ratio where HI is the highest speed in the structure and LO is the lowest speed in the structure: (HI−LO)/(HI+LO)

If calculated range is greater than 0.3, as determined in test 297, step 299 limits it to 0.3 so that large range values will not force a premature solution.

If the range is less than 0.3, test 301 determines if the BOOT FLAG is set. If it is, step 303 subtracts 0.05 from range. If not, step 305 subtracts 0.1 from range.

Step 307 then calculates the "goodness" of the ratio by multiplying the modified range number by the structure score (which represents a constant related to the time that ratio has been present and is an indicator of its persistence and consistency over time).

If goodness is greater than 8, as determined by step 309, the ratio is deemed to be the correct ratio by the calibration routine. Step 311 then sets the ACQUIRE DONE flag to indicate a good ratio has been acquired and the calibration process is over. Step 311 then writes the newest ratio to nonvolatile memory, and step 313 ends the (evalu8) DO loop and returns to the main loop processing.

If test 309 determines that the current structure's goodness was not 8 or greater, and test 315 determines the BOOT FLAG is set, step 317 and step 319 try to acquire the correct ratio by score alone rather than using goodness (product range times score). This is done by multiplying the score by 0.03 and testing to determine if the product is greater than 8. If it is, acquisition is done, and step 311 is performed.

If this fails, step 295 increments the pointer to the next structure, checks if the (evalu8) loop is finished (test 321) and, if so, exits. If the loop is not done, the next pass in (evalu8) is started via path 323.

The complexity of the processing of FIGS. 3A through 3F is not critical to the invention, and simpler processes to find the correct ratio may be used so long as they are all automatic and do not require any input from the operator in terms of rejecting wrong patrol speeds or entering of configuration data. The general idea of the process of FIGS. 3A through 3F is to calculate several ratios for various radar found ground speeds, and to evaluate each ratio to determine if it is the correct ratio by evaluating how long it persists, and whether it is consistent over a range of different ground speeds. If either one of these characteristics of the ratio found for the true ground speed from stationary object returns is good enough alone to evaluate the reliability of the various ratios, then that characteristic alone may be used in other processes within the teachings of the invention. Any process which can automatically find the right ratio by looking at the speedometer frequency for each ground speed candidate line found in the Fourier spectrum, calculating a ratio and evaluating the ratio for reliability over time and concluding which ratio is the correct one without any input from the operator and fully automatically will suffice to practice the invention.

Thus, a broad description of the calibration process is:

a) reading at least one signal frequency output from a vehicle speed sensor to a police Doppler traffic radar, and obtaining from the Doppler police traffic radar what the traffic radar computes is the correct ground speed calculated from the reflected signal from a stationary object at the time the signal frequency from said vehicle speed sensor is read;

b) repeating the process of step a) multiple times and storing the data;

c) automatically determining the reliability of the ratio without any input from a human being needed by evaluating over time one or more factors which are indicative that said police Doppler traffic radar has locked onto and is tracking the correct ground speed including at least persistence of the same ratio for a plurality of different ground speeds obtained from said police Doppler traffic radar; and d) when the reliability of the ratio has been adequately established, storing the ratio so determined to be accurate in a memory for use by said police Doppler traffic radar in calculating the speed of moving targets when searching in moving modes.

Figure 4:
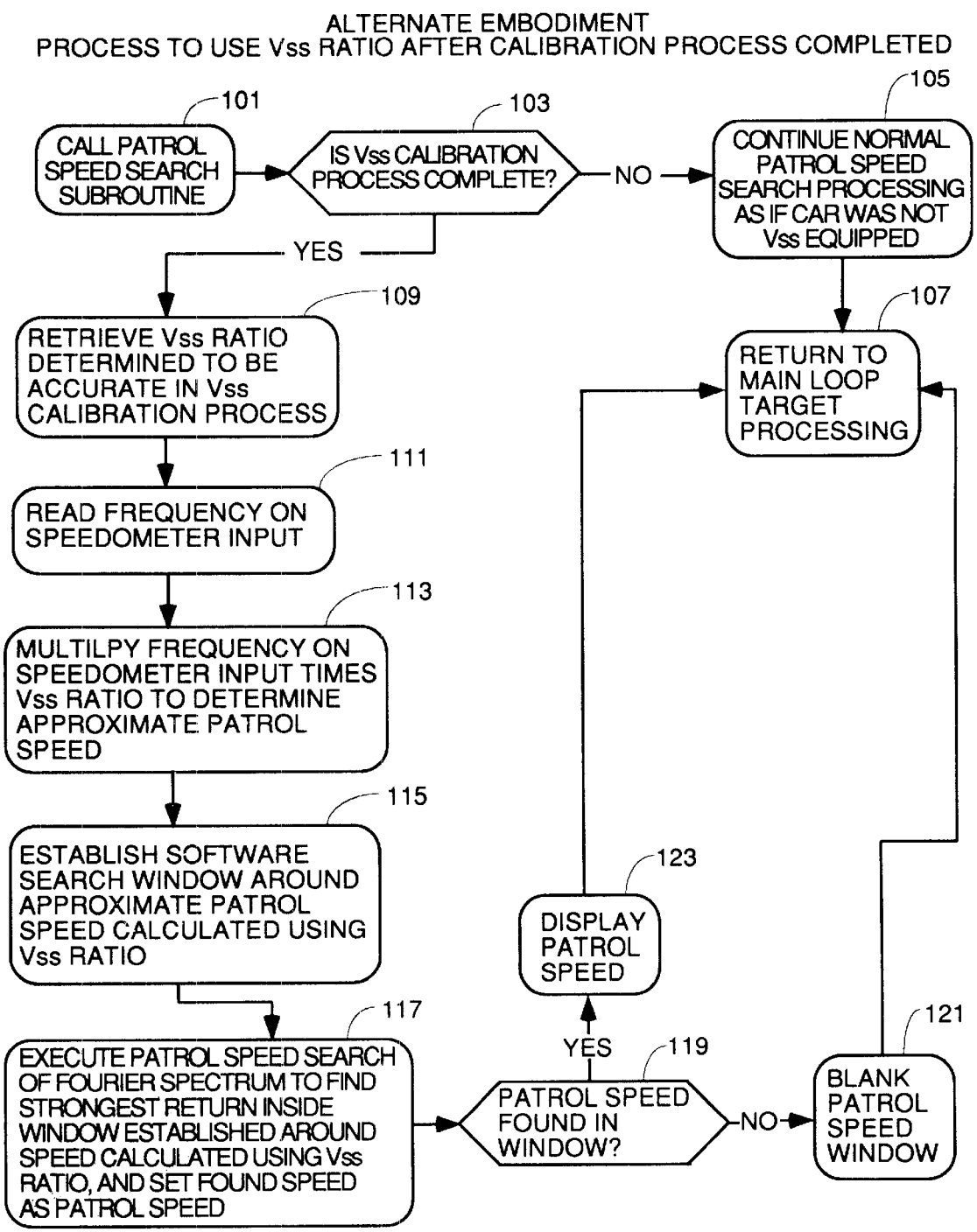
FIG. 4 is a flowchart of an alternative embodiment of the process of using the ratio calculated in FIGS. 3A through 3F to control the upper and lower limits of the patrol speed search to a window around the speed calculated from the frequency appearing at the speedometer input.

Referring to FIG. 4, there is shown a flowchart of an alternative embodiment of the process to use the Vss ratio calculated by the automatic calibration processing of FIGS. 3A through 3F to establish a software search window in which to search for the patrol speed. Step 101 represents whatever processing in the main loop initiates the patrol speed search. Typically this is a subroutine call. Test 103 determines if the Vss calibration process is complete. If it is not, then the patrol speed must be found in a conventional way, and processing proceeds to step 105 to continue normal patrol speed search processing as if the car was not Vss equipped. After the normal patrol speed search of step 105, step 107 is performed to return to the main loop target search processing.

If test 103 determines that Vss calibration has been successfully completed, step 109 is performed. In step 109, the Vss ratio determined to be accurate in the process of FIGS. 3A through 3F is retrieved. Next, step 111 is performed to read the frequency on the speedometer input line. Then, in step 113, the frequency on the speedometer input is multiplied times the Vss ratio retrieved in step 109 to determine an approximate patrol speed. In step 115, a software search window is established around the approximate patrol speed calculated in step 113 using the Vss ratio. Typically, this software window has the speed calculated at step 113 in the middle and extends on either side of it by a percentage of the center window speed. In alternative embodiments, the search window extends some fixed or programmable number of miles per hour on either side of the window center frequency. The purpose of the software window is to limit the speed range in which the patrol speed search is performed to speed up the search and eliminate shadowing problems by virtually guaranteeing that the correct patrol speed will be found in the radar returns within the search window. Step 117 represents a patrol speed search for the strongest radar return within the software window established by step 115. Test 119 determines whether a patrol speed was found in the search window. If not, step 121 is performed to blank the patrol speed display and processing returns to the main loop. If a patrol speed is found within the software window, step 123 is performed to display the patrol speed found from the radar returns.

Figure 5:
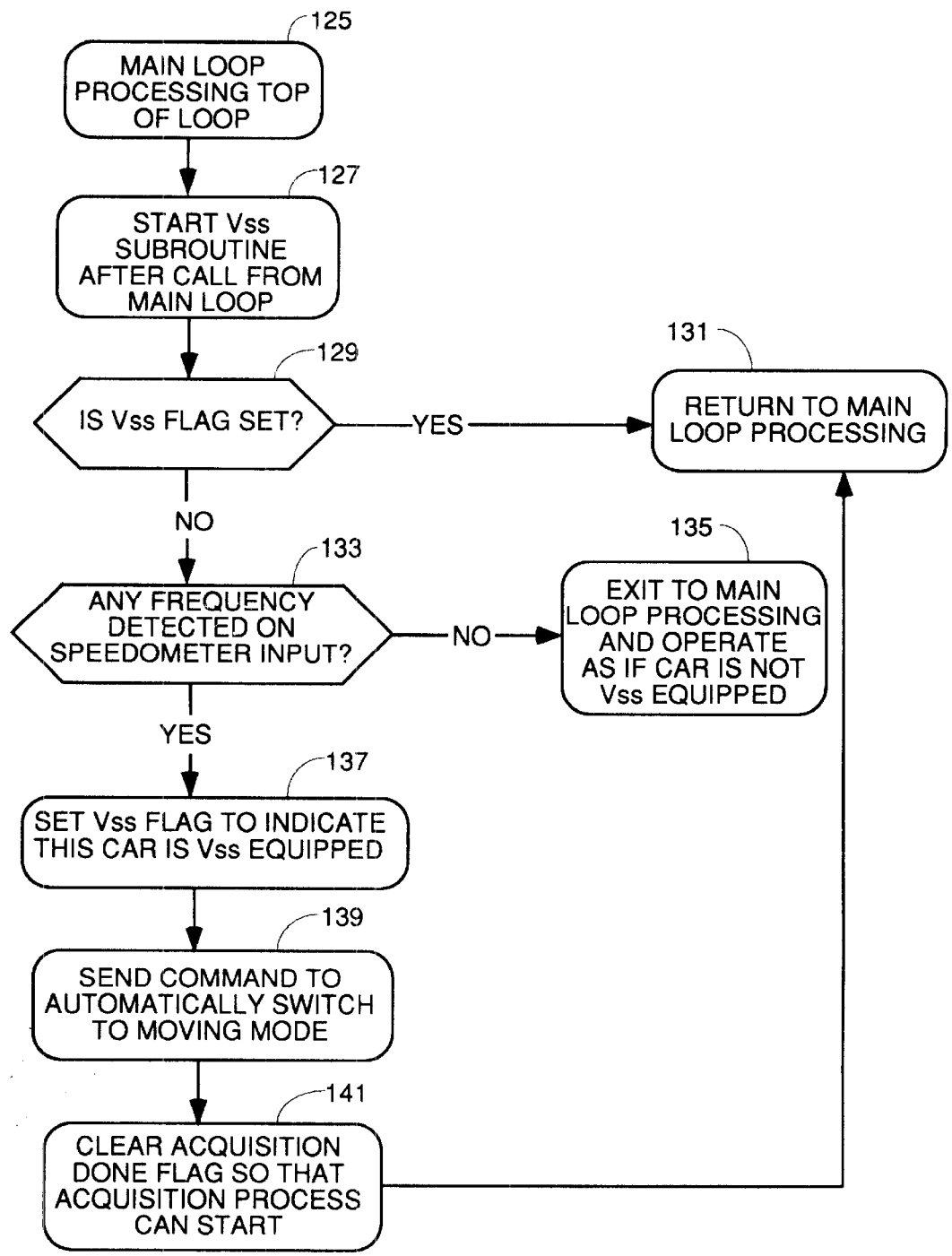
FIG. 5 is a flowchart of the preferred embodiment of the process of determining whether the patrol car in which the radar is installed is a Vss equipped car.

FIG. 5 is a flowchart of the preferred embodiment of the process of determining whether the patrol car in which the radar is installed is a Vss equipped car. Step 125 represents main loop processing before the call to this routine, and step 127 represents the start of the Vss subroutine when called. Test 129 represents a determination whether the Vss flag is set. If it is, processing returns to the main loop, as symbolized by step 131. If the Vss flag is not set, processing of test 133 is performed to determine if any non-zero frequency is present at the speedometer input. If a zero frequency is detected, it does not mean the car is not Vss equipped, it only means that the radar is not sure yet. Thus, block 135 exits to the main loop processing, and the radar operates as if it is installed in a non-Vss equipped car.

If any non-zero frequency is detected on the speedometer input by test 133, step 137 sets the Vss flag to indicate the car is Vss equipped. Then step 139 is performed to automatically switch the radar to moving mode. Finally, step 141 clears the acquisition done flag so that the radar knows that a speedometer ratio calibration process must be performed to acquire the correct ratio. Processing then returns to the main loop at step 131.

Figure 6:
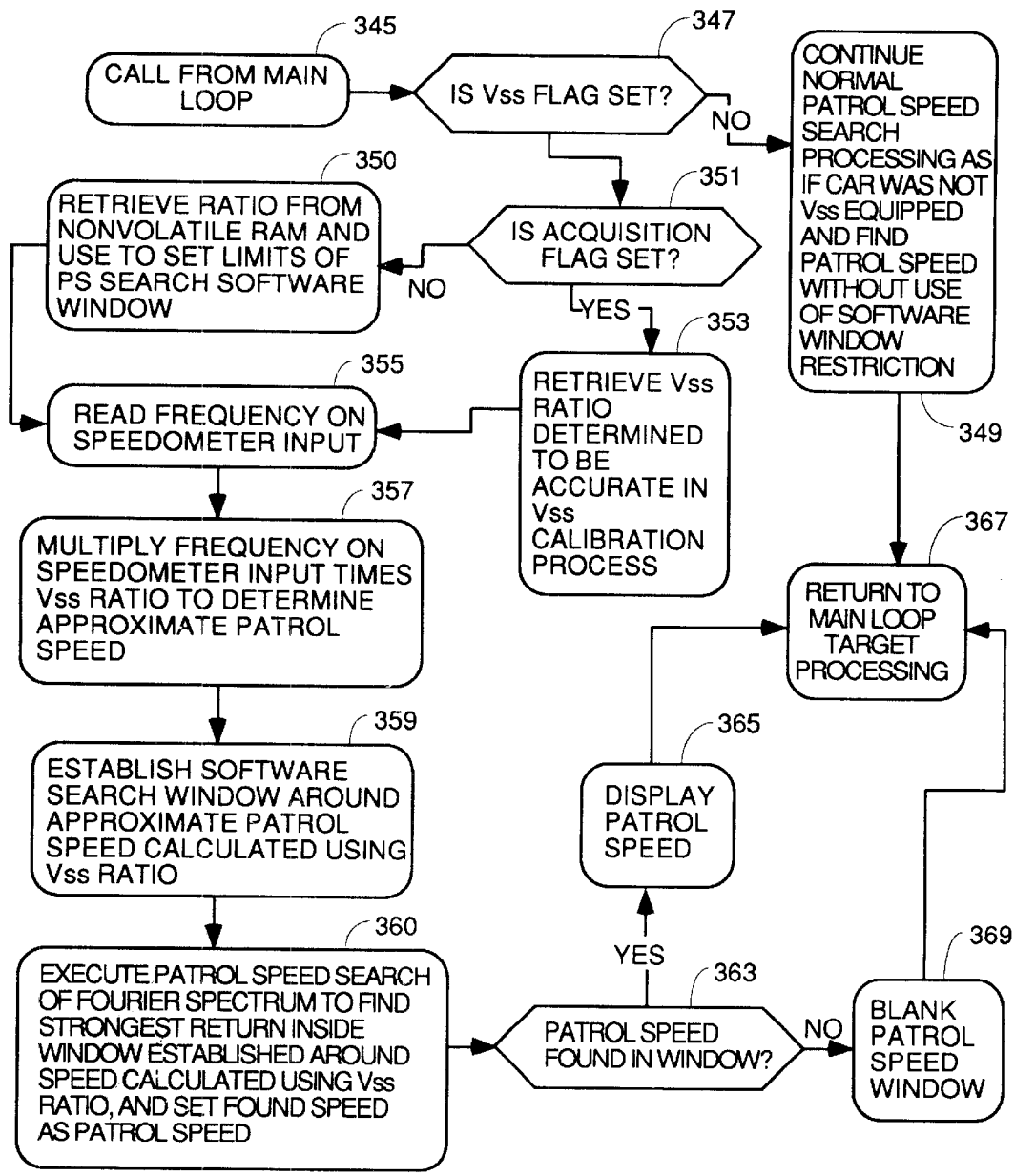
FIG. 6 is a flowchart of the preferred embodiment of the process of using the ratio calculated in FIGS. 3A through 3F to control the upper and lower limits of the patrol speed search window.

FIG. 6 is a flowchart of the preferred embodiment of the process of using the ratio calculated in FIGS. 3A through 3F to control the upper and lower limits of the patrol speed search window. Step 345 represents a call to the subroutine that sets the search window based upon the captured ratio. In step 347, whether the Vss flag is set is determined. If not, the radar continues a normal patrol speed search of the radar returns as if the car was not equipped with Vss even if it actually is, as symbolized by step 349. The patrol speed is found in this case without using the steering or restriction of the search using a software window.

If step 347 finds the Vss flag set, it means the car has a speedometer output connected to the radar and at least once the car has moved since the power up event. Test 357 is performed if Vss is set to determine if the Acquisition Done flag is set. If it is, step 353 is performed to read the ratio determined to be accurate in the Vss calibration process of FIGS. 3A–3F.

Then step 355 is performed to read the frequency currently on the speedometer input. Then step 357 is performed to multiply the frequency ready in step 355 times the Vss ratio read from the non-volatile memory to determine an approximate patrol speed. Step 359 uses this approximate patrol speed calculated in step 357 as the center of a software search window which extends on either side of the approximate patrol speed by some predetermined number of miles per hour which can be fixed, programmable or calculated as a percentage of the speed of the center of the window. Step 360 is then performed to execute a patrol speed search of the Fourier spectrum lines within the software search window to find the strongest spectral line within the window. The strongest spectral line so found is then set as the patrol speed for subsequent moving mode target searches although the patrol speed so found might, in some embodiments, be subjected to other qualification tests known in the prior art to make sure it is not a false patrol speed.

Test 363 determines if a patrol speed was found in the software search window. If a patrol speed was found, step 365 displays the patrol speed, and processing returns to the main loop in step 367. If no patrol speed was found in the software search window, step 369 blanks the patrol speed window, and processing returns to the main loop in step 367.

If test 351 determines that the acquisition done flag is not set, it means that no new ratio has yet been qualified so it is assumed that the last ratio stored in nonvolatile RAM is still correct. Accordingly, step 350 is performed to retrieve the last good ratio stored in nonvolatile RAM for use in setting the center speed of the software search window. Thereafter, steps 355 through 367 are performed exactly as previously described.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. A method of automatically determining a ratio between the frequency of an output signal from a vehicle speed sensor and the vehicle's speed using a police Doppler traffic radar coupled to said vehicle speed sensor, comprising the steps:

a) reading at least one signal frequency output from a vehicle speed sensor to a police Doppler traffic radar, and obtaining from the police Doppler traffic radar what the traffic radar computes is the correct ground speed calculated from the reflected signal from a stationary object at the time the signal frequency from said vehicle speed sensor is read;

b) repeating the process of step a) multiple times and storing the data;

c) automatically determining the reliability of the ratio without any input from a human being needed by evaluating over time one or more factors which are indicative that said police Doppler traffic radar has locked onto and is tracking the correct ground speed including at least persistence of the same ratio for a plurality of different ground speeds obtained from said police Doppler traffic radar.

2. A process for using an approximate ground speed determined using a vehicle speed sensor to steer the search of a police Doppler police radar for a ground speed to be used in moving mode target searches, comprising the steps:

a) reading at least one signal frequency output from a vehicle speed sensor to a police Doppler traffic radar, and obtaining from the police Doppler traffic radar what the traffic radar computes is the correct ground speed calculated from the reflected signal from a stationary object at the time the signal frequency from said vehicle speed sensor is read;

b) repeating the process of step a) multiple times and storing the data;

c) automatically determining the reliability of the ratio without any input from a human being needed by evaluating over time one or more factors which are indicative that said police Doppler traffic radar has locked onto and is tracking the correct ground speed including at least persistence of the same ratio for a plurality of different ground speeds obtained from said police Doppler traffic radar;

d) when the reliability of the ratio has been adequately established, storing the ratio so determined to be accurate in a memory for use by said police Doppler traffic radar in calculating the speed of moving targets when searching in moving modes;

e) calculating an approximate ground speed by reading said ratio stored in said memory and multiplying said ratio times the frequency received from a vehicle speed sensor;

f) using said approximate ground speed calculated in step e) to establish and limit the range of speeds to be searched by said police Doppler traffic radar for a ground speed; and g) searching the range of speeds established in step f) for the strongest reflected radar signal and setting the ground speed equal to the speed which corresponds to the frequency of said strongest reflected radar signal.

3. A process for finding a ground speed in a police Doppler traffic radar, comprising the steps:

a) automatically determining whether a police traffic radar is installed in a Vss equipped car, and monitoring for any nonzero frequency at an input of said police Doppler traffic radar that would be coupled to a speed sensor if the vehicle was Vss equipped;

b) if a conclusion is drawn that the traffic radar is being used in a vehicle which is not Vss equipped, finding ground speed in a conventional manner without use of any ground speed search window steered using data derived from a vehicle speed sensor;

c) if a conclusion is drawn that the traffic radar is installed in a vehicle which is Vss equipped, monitoring the frequency received from the vehicle speed sensor, and causing automatic switching of said police traffic radar from moving mode to stationary mode when the vehicle is not moving and automatic switching from stationary mode to moving mode when the vehicle begins to move; and at least once after power is first supplied to said police Doppler traffic radar and said radar is turned on, performing the following steps to implement an automatic calibration process to determine the correct ratio between frequency supplied from said speed sensor:

d) reading at least one signal frequency output from a vehicle speed sensor to a police Doppler traffic radar, and obtaining from the police Doppler traffic radar what the traffic radar computes is the correct ground speed calculated from the reflected signal from a stationary object at the time the signal frequency from said vehicle speed sensor is read;

e) repeating the process of step d) multiple times and storing the data;

f) automatically determining the reliability of the ratio without any input from a human being needed by evaluating over time one or more factors which are indicative that said police Doppler traffic radar has locked onto and is tracking the correct ground speed including at least persistence of the same ratio for a plurality of different ground speeds obtained from said police Doppler traffic radar;

g) when the reliability of the ratio has been adequately established, storing the ratio so determined to be accurate in a memory for use by said police Doppler traffic radar in calculating the speed of moving targets when searching in moving modes; and after said ratio has been determined to be reliable, performing the following steps each time a moving mode search is to be performed by said police Doppler traffic radar:

h) calculating an approximate ground speed by reading said ratio stored in said memory and multiplying said ratio times the frequency received from a vehicle speed sensor;

g) using said approximate ground speed calculated in step h) to establish and limit the range of speeds to be searched by said police Doppler traffic radar for a ground speed return; and g) searching the range of speeds established in step g) for the strongest reflected radar signal and setting the speed that corresponds to the frequency of said strongested reflected radar signal as the ground speed for use in calculating the actual speed of a moving target whose relative speed was determined in a moving mode target search.

4. A police radar comprised of:

a conventional digital signal processing police Doppler traffic radar having a digital signal processor programmed to be able to do moving mode and stationary mode target searches and programmed to find a vehicle ground speed from radar returns reflected from stationary objects, said radar having an input for coupling to a vehicle speed sensor; and one or more computer programs to control said digital signal processor to monitor said vehicle speed sensor input and automatically determine if said radar is installed in a vehicle having a vehicle speed sensor coupled to said police Doppler traffic radar, and causing said digital signal processor to find said ground speed in a conventional way if said police Doppler traffic radar under predetermined circumstances including the circumstance that said traffic radar is not installed in a vehicle having a coupling between a vehicle speed sensor and said traffic radar, said one or more computer programs also for monitoring the frequency received from said vehicle speed sensor in Vss equipped vehicles and automatically causing said traffic radar to switch from stationary mode to moving mode when said vehicle is moving, and for automatically causing said traffic radar to switch to stationary mode when the vehicle is not moving, and said one or more computer programs also for controlling said digital signal processor to automatically determine the correct ratio between any frequency received from said vehicle speed sensor and the true ground speed, and, when a moving mode search is to be made, for using said ratio and the frequency received from said vehicle speed sensor to set the frequency location and frequency limits of a software window which limits the range of speeds in which a ground speed search is performed by said digital signal processor.

* * * * *